Figure 1:
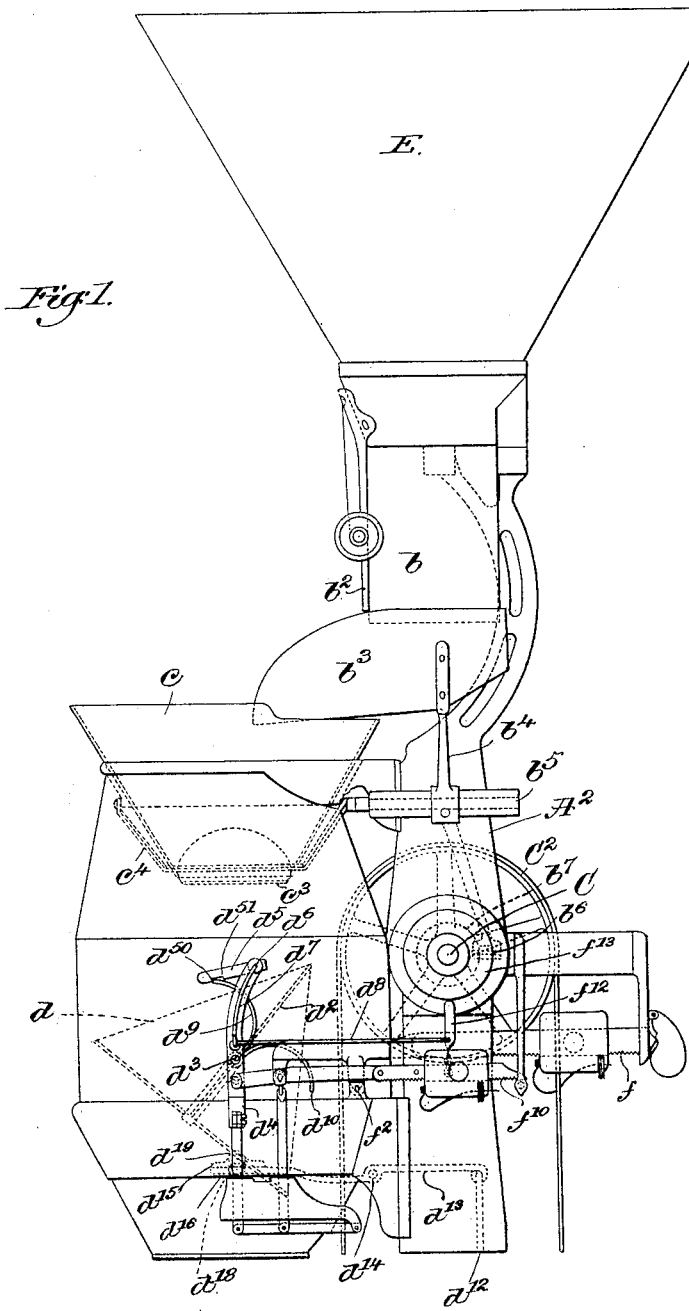

No. 636,058. Patented Oct. 31, 1899.
J. A. OSTENBERG.
WEIGHING MACHINE.
(Application filed June 1, 1897.)
(No Model.) 7 Sheets—Sheet 1.

Witnesses.
John F. L. Pruitlett
Jas. J. Maloney.

Inventor.
John A. Ostenberg.
by Jo. P. Livermore atty.

No. 636,058. Patented Oct. 31, 1899.
J. A. OSTENBERG.
WEIGHING MACHINE.
(Application filed June 1, 1897.)

(No Model.) 7 Sheets—Sheet 2.

No. 636,058. Patented Oct. 31, 1899.
J. A. OSTENBERG.
WEIGHING MACHINE.
(Application filed June 1, 1897.)
(No Model.) 7 Sheets—Sheet 3.

Witnesses:
Inventor:
John A. Ostenberg.

No. 636,058. Patented Oct. 31, 1899.
J. A. OSTENBERG.
WEIGHING MACHINE.
(Application filed June 1, 1897.)
(No Model.) 7 Sheets—Sheet 4.

Witnesses:
John F.L. Printlest
Jas J. Maloney

Inventor:
John A. Ostenberg.
By Jos. P. Livinmo
Atty

No. 636,058. Patented Oct. 31, 1899.
J. A. OSTENBERG.
WEIGHING MACHINE.
(Application filed June 1, 1897.)
(No Model.) 7 Sheets—Sheet 5.
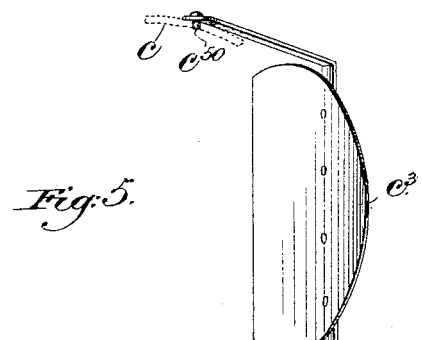
Fig. 5.
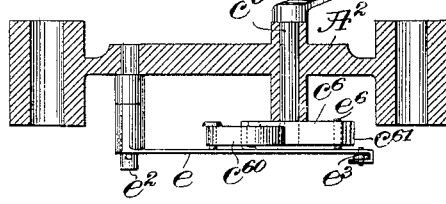
Fig. 6.
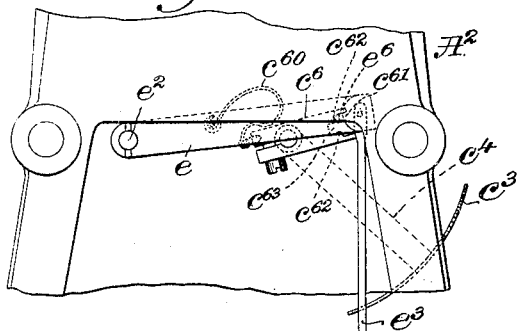
Fig. 7. Fig. 8.
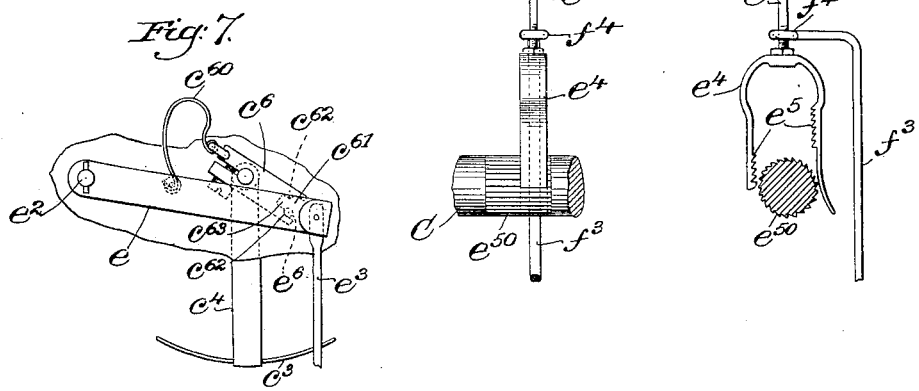
Witnesses.
John F. L. Prinkle
Jas. J. Maloney.
Inventor:
John A. Ostenberg.
by Jos. P. Livermore
Atty.
THE NORRIS PETERS CO., PHOTO-LITHO., WASHINGTON, D. C.

No. 636,058. Patented Oct. 31, 1899.
J. A. OSTENBERG.
WEIGHING MACHINE.
(Application filed June 1, 1897.)
(No Model.) 7 Sheets—Sheet 6.
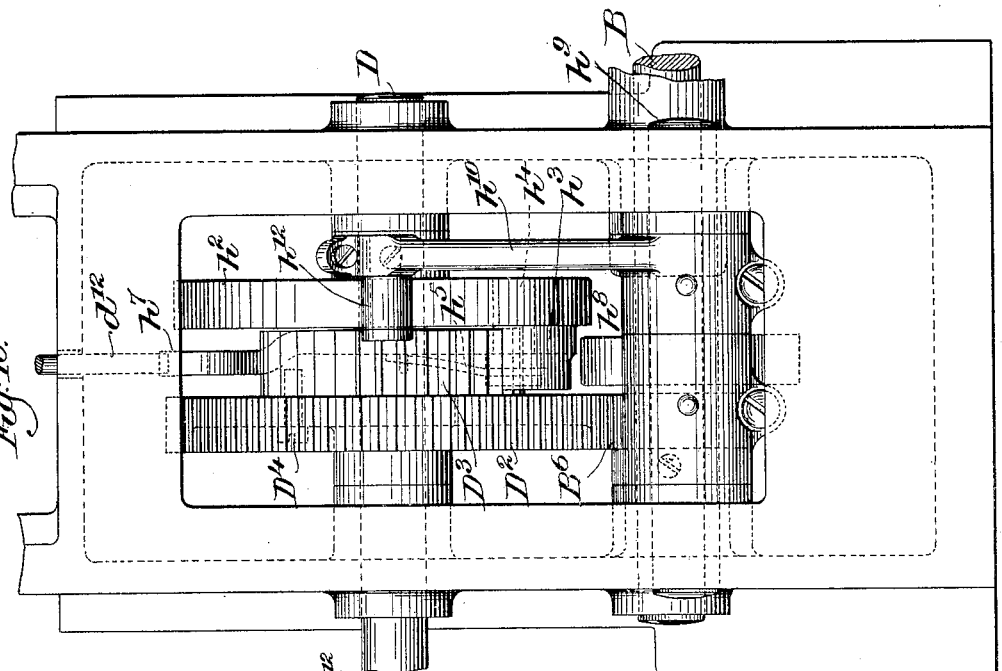
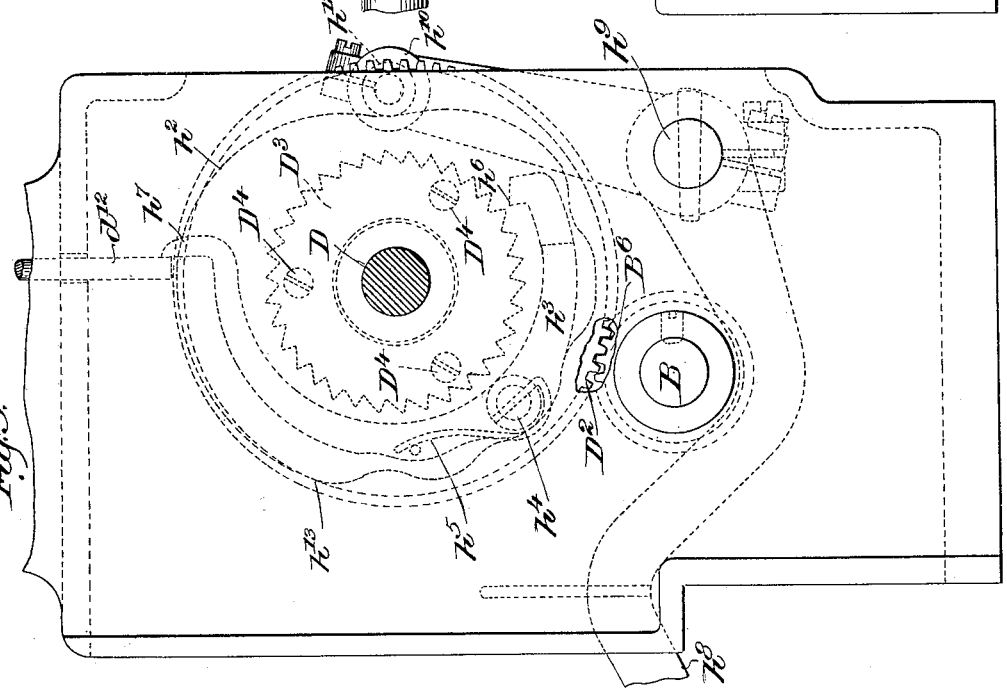
Witnesses.
Inventor.
John A. Ostenberg.
by Jos. P. Livermore
Atty.
THE NORRIS PETERS CO., PHOTO-LITHO., WASHINGTON, D. C.

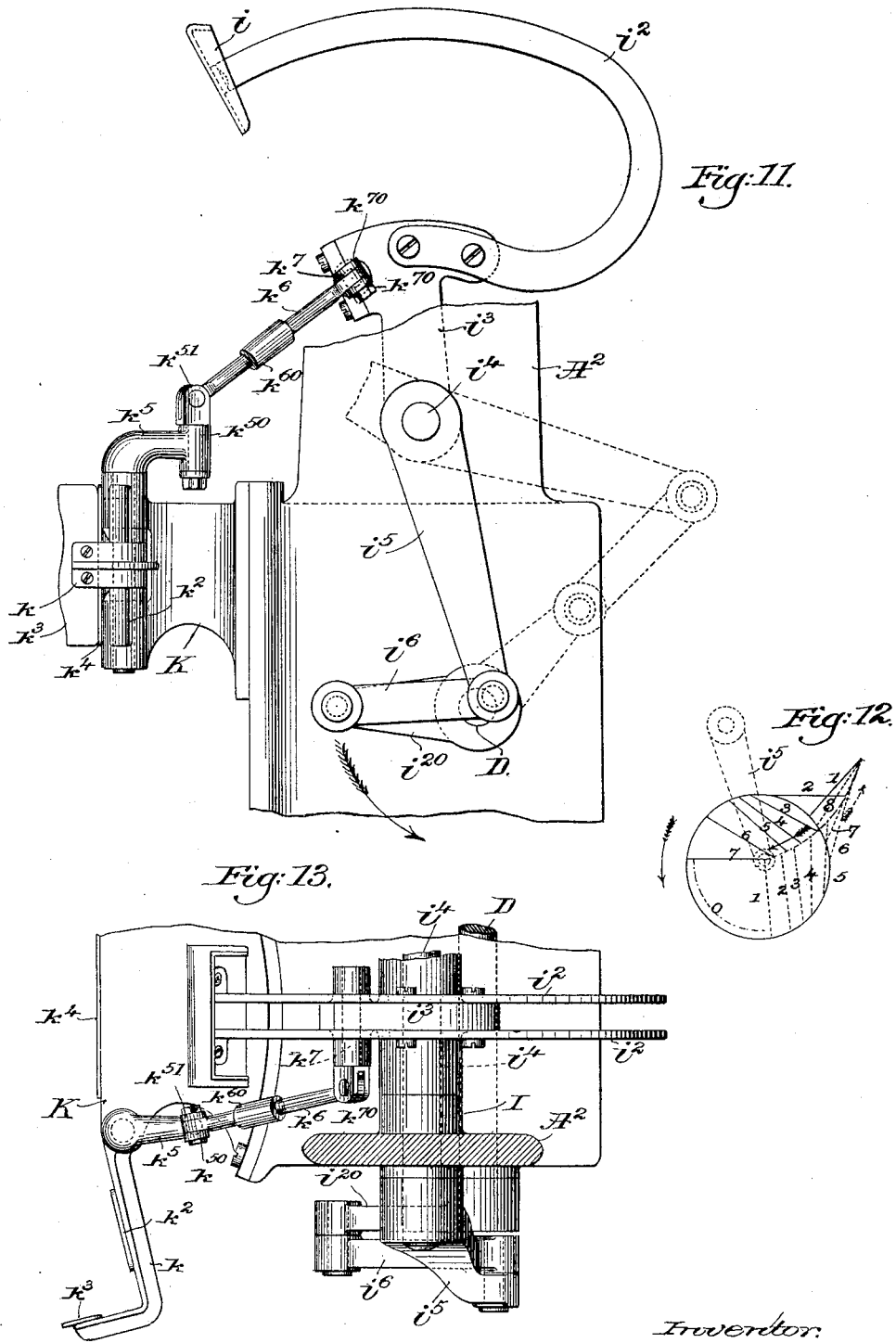

UNITED STATES PATENT OFFICE.

JOHN A. OSTENBERG, OF WESTMINSTER, VERMONT, ASSIGNOR TO FREDERICK M. GILBERT, OF WALPOLE, NEW HAMPSHIRE.

WEIGHING-MACHINE.

SPECIFICATION forming part of Letters Patent No. 636,058, dated October 31, 1899.

Application filed June 1, 1897. Serial No. 638,942. (No model.)

*To all whom it may concern:*

Be it known that I, JOHN A. OSTENBERG, of Westminster Station, in the county of Windham and State of Vermont, have invented an Improvement in Weighing-Machines, of which the following description, in connection with the accompanying drawings, is a specification, like letters on the drawings representing like parts.

The present invention relates to an automatic weighing and packing machine, and is embodied in a machine having instrumentalities whereby the material is delivered from a suitable hopper or receptacle to the weighing devices which operate to weigh, apportion, and deliver the desired amount of material into a package or receptacle, and other instrumentalities whereby the material so delivered is properly packed.

So far as relates to the weighing and first delivery or dumping of the material into packages the machine embodying the present invention has substantially the same elements or instrumentalities as the machine shown and described in Patent No. 492,485, granted to me February 28, 1893, the construction and arrangement, however, having certain features of novelty not described in said prior patent or embodied in the invention therein set forth, such features constituting part of the present invention.

In addition to the weighing and delivering devices, however, the present invention is further embodied in apparatus for properly packing the material in the packages after the requisite amount has been delivered thereto, the said apparatus comprising agitating, compressing, and holding devices, the agitating devices first operating to shake down the material in the package prior to the operation of the compressing device, while the holding devices are adapted to support the package during the compression of the material therein in order to properly withstand the pressure and prevent the bursting of the package. The said holding devices are arranged to "close" and "open," so to speak— that is to say, to engage and disengage the package, engaging the same just prior to the operation of the compressing device and disengaging it just after such operation, so that the filled package may be removed by the attendant and an empty package put in its place to be filled.

The compressing device and holding device coöperate as above named after the operation of the agitating device and are provided with suitable actuating mechanism, which is adapted to be intermittingly operated and controlled in its operation by the weighing and dumping receptacle, in which the material is weighed and from which it is delivered.

The machine as a whole is provided with suitable operating mechanism whereby the delivery-chutes from which the material is delivered to the weighing receptacle are vibrated or agitated substantially as shown in the prior patent aforesaid, and the said operative mechanism is caused to operate intermittingly on the packing devices, the connecting mechanism being controlled by the movement of the weighing-receptacle, so that when the said receptacle has the proper amount therein and is moved to dump the same it is caused to connect the operating mechanism for the said compressor and holding device with the mechanism which is constantly operating to agitate the delivery-tubes, causing the said parts to perform one complete cycle of operations, the said parts then being automatically disconnected, so as to remain inoperative until another predetermined quantity of material has been weighed and delivered. The compressor is also shown as provided with actuating mechanism of novel construction and arrangement, whereby its forward or operative movement is made gradual and its return movement rapid. Substantially the same movement is imparted to the holding devices for the package, so that after the package is filled and its contents compressed the said holding devices will open rapidly, there being, moreover, a dwell at the time when they are fully open and the compressor is in its initial position, so that ample time is afforded for the substitution of the new package for the one which has been filled, while the compressor is maintained away from the mouth of the other package a sufficient time to allow the same to receive the charge from the weighing-receptacle.

The invention further consists in novel details of construction and arrangement which will be hereinafter more fully described.

Figure 2:
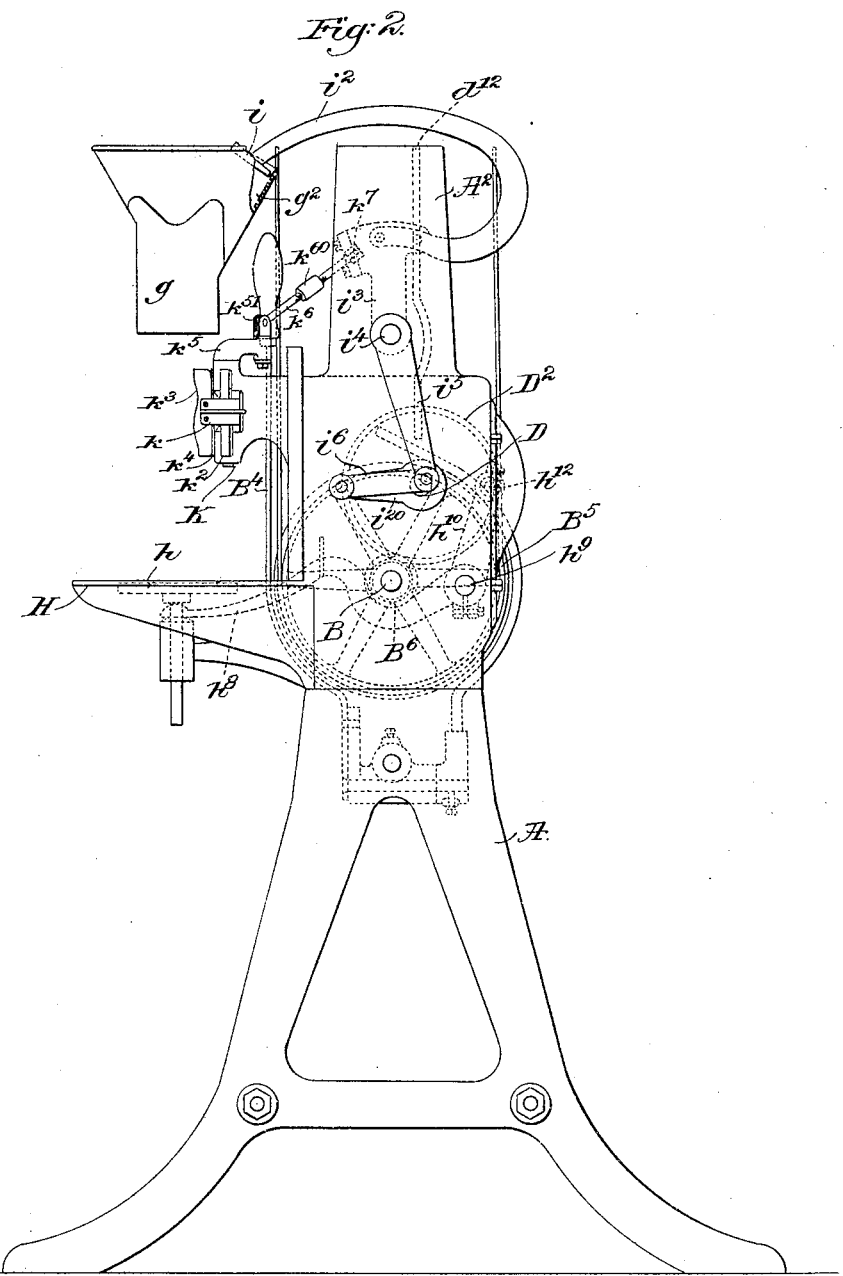
Figure 3:
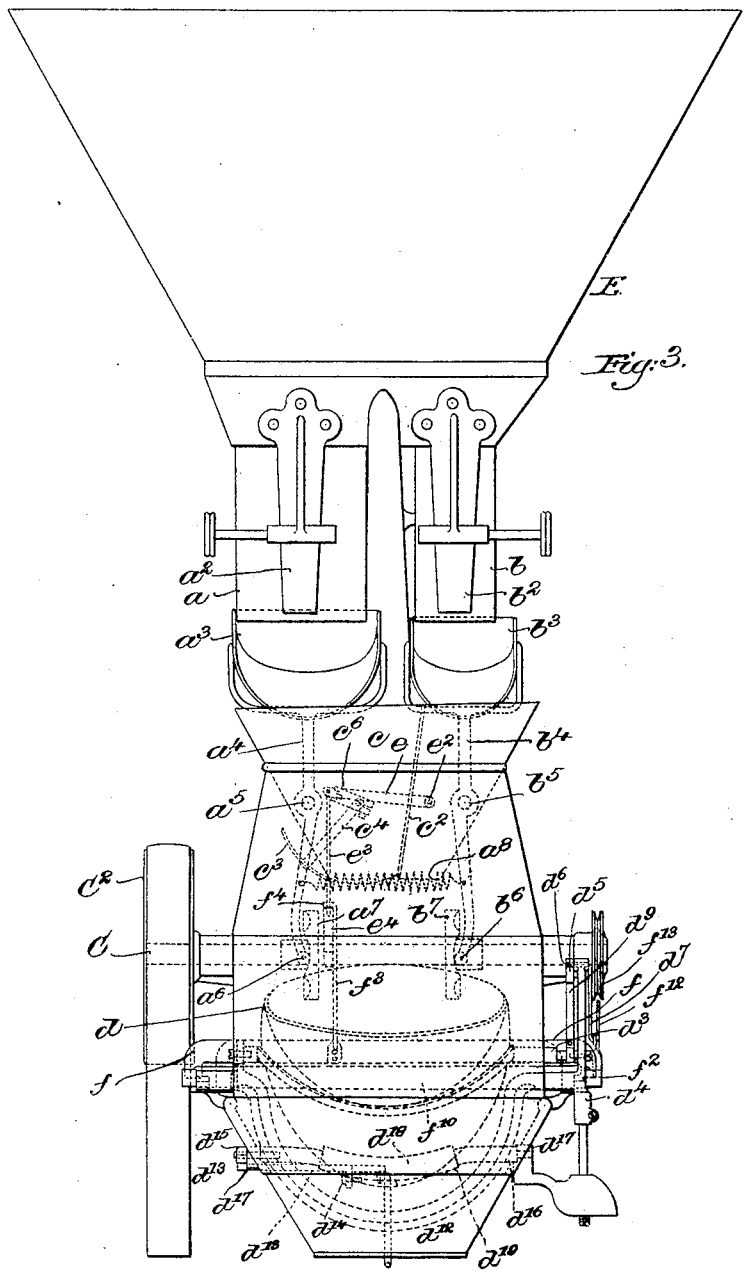
Figure 4:
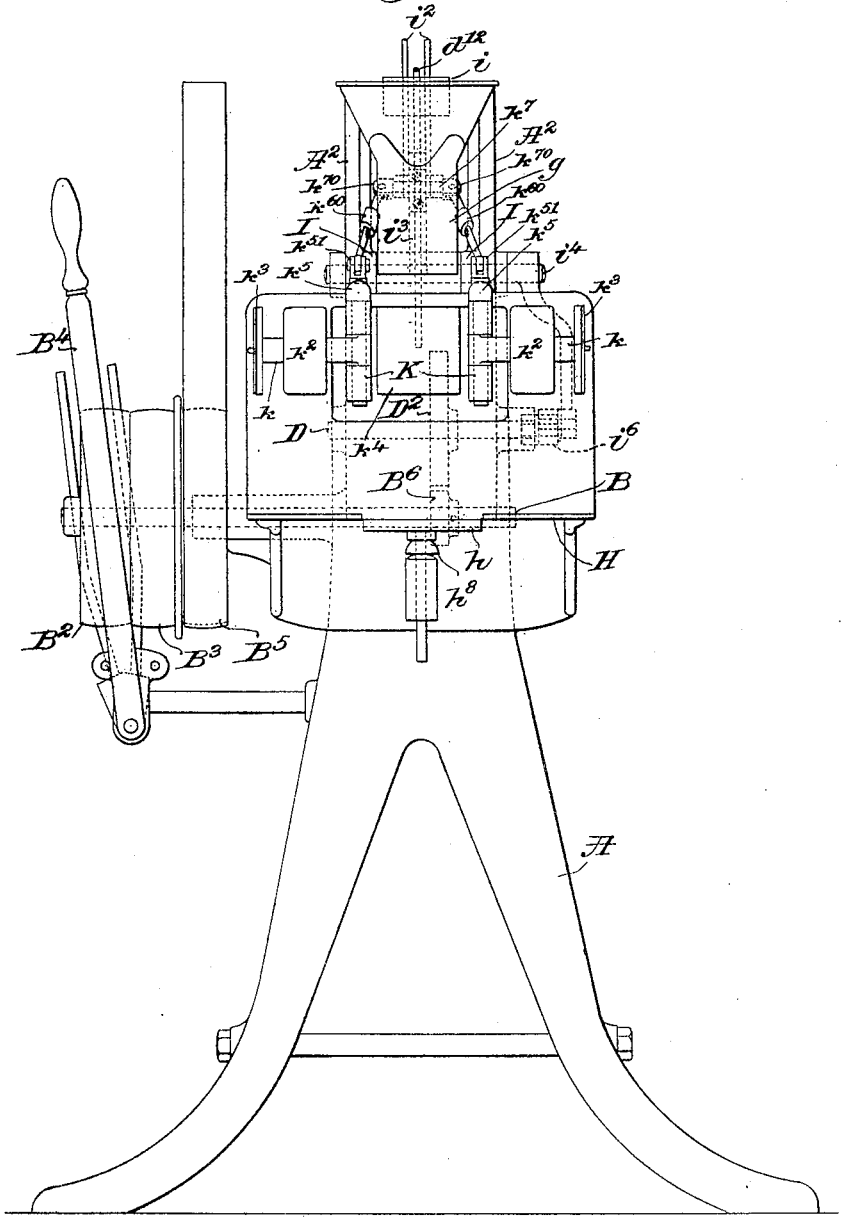

Figure 1 is a side elevation of the top portion of the machine where the material is weighed; Fig. 2, a similar side elevation of the lower portion of the machine where the material is delivered to the package and compressed therein; Figs. 3 and 4, front elevations of those parts of the machine shown in Figs. 1 and 2, respectively; Fig. 5, an enlarged horizontal sectional detail showing the controlling device for the main chute; Fig. 6, a front elevation of the same, showing the actuating and locking mechanism therefor; Fig. 7, a detail showing said locking mechanism in another position; Fig. 8, a side elevation of the actuating device alone; Fig. 9, an enlarged detail showing a sectional elevation of the controlling mechanism whereby the compressor and its coöperating parts are caused to operate in response to the movement of the weighing-receptacle to dump the material; Fig. 10, a top plan view of the same; Fig. 11, a detail, on an enlarged scale, showing the compressing device, its operating-shaft, and the compensating connecting mechanism whereby the proper movement of said compressing device is attained; Fig. 12, a diagram illustrating the operation of said compensating mechanism; and Fig. 13, a top plan view of the parts shown in Fig. 11, a portion of the frame being shown in section.

Since the weighing mechanism and the devices for holding the package and compressing the material therein are substantially independent of each other in their operation, except that the operation of the latter is controlled by that of the former, the upper and lower parts of the machine are shown in separate figures in order that the various details may be illustrated in their relations to each other upon a larger scale, it being understood, therefore, that the complete machine is mounted on a standard A, Fig. 2, having an upright portion $A^2$, Figs. 1 and 2, which contains the main driving-shaft B, having fast and loose pulleys $B^2$ and $B^3$ and the belt-shifter $B^4$ to control the operation of the machine, and an auxiliary shaft C, having a pulley $C^2$, adapted to be driven by a belt from a pulley $B^5$ on the shaft B. The said shaft B thus constitutes the main driving-shaft of the machine, (it being obvious that power might be equally well applied to the shaft C, if desired,) and the said shaft C is continually rotated during the operation of the machine, so as to operate the devices which cause the material to be weighed, as follows: The material to be weighed, which is placed in a hopper E or other main feeding device, shown as supported at the top of the post $A^2$, is received from said hopper through two delivery-chutes $a$ and $b$, each provided with a regulating device $a^2$ and $b^2$, respectively, by a pair of vibrating delivery-pans $a^3$ and $b^3$, shown as mounted, respectively, on forked supports or arms $a^4$ and $b^4$, pivoted at $a^5$ and $b^5$ in the frame of the machine and provided at their ends with cam-rolls $a^6$ and $b^6$, coöperating with wheels $a^7$ and $b^7$, having irregular cam-surfaces adapted to swing the said arms on their pivots to agitate the delivery-pans $a^3$ and $b^3$. The said arms $a^4$ and $b^4$ are shown as held against the surfaces of the wheels $a^7$ $b^7$ by means of a spring $a^8$, connected at one end to one of said arms and at the other end to the other, the tendency being to draw the lower ends of said arms together, while the projecting portions of the cam-surfaces tend to separate them, the construction thus far described being substantially the same as shown in my prior patent aforesaid. From the said delivery-pans the material is shaken into a funnel $c$, which opens over the weighing-receptacle $d$, so that all the material which is delivered into the said funnel will be received by one side or the other of said weighing-receptacle, the construction and operation of which are substantially the same as shown and described in my prior patent, above referred to, except for certain details which will be hereinafter more fully described.

As indicated in Fig. 3, the chute $a$ is intended to be of much larger capacity than that of the chute $b$, the object being, as described in the prior patent aforesaid, to rapidly deliver to the weighing-receptacle from said main chute sufficient material to tip the main scale, said main chute being controlled in its delivery by mechanism coöperating with the main scale, and to then prevent the further delivery of material through said "main" chute, as it may be called, and to complete the supply of material from the small or supplemental chute, which is not controlled, but is adapted to feed continually. To thus control the main chute and to provide for the continuous operation of the supplemental chute, the funnel $c$ is shown as provided with a partition $c^2$, which divides it into two compartments, one adapted to receive material from the main chute and direct it toward the weighing-receptacle and the other adapted to receive material from the supplemental chute and direct it toward the weighing-receptacle, and the former of said compartments is shown as provided with a controlling device $c^3$, consisting of a valve or gate adapted to be moved across the mouth of the chamber aforesaid. To open and close the said gate, it is shown as connected to the end of a swinging arm or support $c^4$, having at one end a bearing $c^5$ in the casing $A^2$ at the top of the frame and being pivotally connected at its opposite end to the side of the funnel $c$, as shown at $c^{50}$, Fig. 5. The said support $c^4$ has connected thereto an arm or projection $c^6$, coöperating with the lever $e$, pivoted at $e^2$ and pivotally connected with an arm $e^3$, having a yoked or forked extremity $e^4$, provided with ratchet-teeth $e^5$, projecting in opposite directions and adapted by a lateral movement of said arm to be alternately engaged by a ratchet-wheel $e^{50}$ or toothed portion of the shaft C, which, as has been stated, is adapted to be continually rotated, so that the said ratchet will produce an upward or downward movement of said yoke, and thereby swing the lever $e$ on its pivot. The said forked extremity or yoke $e^4$ is caused to coöperate with the teeth $e^{50}$ by means of an arm $f^3$, provided at its end with a loop $f^4$, Figs. 6 and 8, surrounding the body of the arm $e^3$ and adapted to be swung to correspondingly swing said arm by the movement of the main scale-beam $f$, having knife-edge supports at $f^2$ on the frame, the construction and arrangement of these parts being substantially the same as in my prior patent above referred to, the object being to cause a cessation of the discharge from the main chute in response to the movement of the main scale-beam, which takes place when nearly the whole of the predetermined amount of material has been received by the weighing-receptacle.

To lock the gate in either its open or its closed position, so as to prevent any accidental movement thereof when it is not positively actuated by the devices above described, the arm $c^6$ is provided at one end with a spring $c^{60}$, connected thereto and to the lever $e$, the said lever being shown as adapted to swing across the axis of the said arm $c^6$, so that in one position thereof the tendency of said spring will be to rock the arm $c^6$ in one direction and in the other position thereof its tendency will be to rock the said arm in the opposite direction, in each case there being a reacting tendency so far as relates to the lever $e$. The lever $e$ is caused to operate upon the other end of said arm and is shown as provided with a pin or projection $e^6$, extending into a throat or fork $c^{61}$ at the end of the said arm $c^6$, the main portion of said throat being larger than the diameter of the said projection, so that a certain amount of lost motion is provided for, the operation being as follows: The pin $e^6$ normally stands, as shown, Figs. 6 and 7, in engagement with one or the other of a pair of shoulders $c^{62}$, formed in the sides of the throat $c^{61}$, it being obvious that in either position the tendency of the spring $c^{60}$ is to draw that end of the arm $c^6$ to which it is connected toward the lever $e$, and thus crowd said shoulder into engagement with the said pin and practically lock the lever in one or the other of its extreme positions, since the said arm moves on a shorter radius than that of the lever $e$. Assuming, therefore, that the gate is open, Fig. 6, and the pin $e^6$ in engagement with the upper shoulder $c^{62}$, the first downward movement of the rod $e^3$ when it is thrown by the action of the weighing-receptacle into engagement with the ratchet-wheel $e^{50}$ will pull the pin out of engagement with the said shoulder, the said pin then coming in contact with the contracted portion $c^{63}$ of the throat, while its further movement will cause the arm $c^6$ to swing so as to close the gate. As soon, however, as the pin $e^6$ reaches the point where the arc on which it travels intersects that on which the lower shoulder $c^{62}$ travels it will obviously ride over said shoulder, as shown in Fig. 7, the tendency of the spring then being, as before, to draw together the rear ends of the levers and crowd the pin against the shoulder, locking the parts as before. When the main scale-beam moves in the opposite direction after the material has been weighed and dumped, the rod $e^3$ will be moved in the opposite direction, and the gate will be opened and maintained open substantially as it is closed and maintained closed, as above described.

The weighing and dumping receptacle $d$, or "scale-pan," as it may conveniently be called, is substantially the same as that shown and described in my prior patent, above referred to, and consists of a receptacle divided into two compartments by means of a partition $d^2$ and pivoted at $d^3$ below its center of gravity, so that it has a tendency to swing one way or the other, one side being ready to receive material while the other side is discharging material into the chute or funnel $g$, Fig. 2, to deliver the same to a package supported below said chute. The pivotal support $d^3$ of said scale-pan is in a frame $d^4$, controlled by the main and supplemental scale-beams $f$ and $f^{10}$, the former being adapted to tip when nearly the predetermined quantity of material has been delivered into the receptacle, and in tipping to cause the closure of the gate $c^3$, as above described, while the latter is adapted to be tipped when the whole of the predetermined amount of material has been received by the weighing-receptacle, and by such operation to cause the material to be dumped from the weighing-receptacle and delivered into the package.

The arrangement of the scale-beams and the means whereby the supplemental scale-beam is caused to coöperate with the weighing-receptacle are substantially the same as shown and described in the prior patent aforesaid, the weighing-receptacle, however, being provided with a tripping device of novel construction, forming part of the present invention.

As herein shown, the weighing-receptacle $d$ is held in one position or the other by means of a trigger or latch $d^5$, comprising an arm connected with a pivotal support or spindle $d^6$ at the top of the frame $d^4$, the said spindle having a downwardly-projecting arm $d^7$, whereby the locking arm or latch $d^5$ is caused to be moved by means of a projection $f^{12}$, pivotally connected with the supplemental scale-beam $f^{10}$ and adapted to be carried into contact with a friction-wheel $f^{13}$, as will be described, when the supplemental scale-beam is tipped, the said projection being connected with the arm $d^7$, by means of a link or connecting-rod $d^8$. To coöperate with said trigger, the weighing-receptacle is provided with a pair of oppositely-disposed spring-arms $d^9$ and $d^{10}$, the ends of said arms being adapted to engage, respectively, with shoulders $d^{50}$ and $d^{51}$ in the latch $d^5$. In the position shown in Fig. 1 the right-hand compartment of the weighing-receptacle is in dumping position and the left-hand compartment is in the position to receive the material from the main chute. When, therefore, sufficient material has been received by the weighing-receptacle to tip the main scale-beam, the main supply—that is, the supply from the chute $a$—is cut off, as above described; but the receptacle continues to be filled from the lesser chute $b$, which operates continually. As soon, therefore, as sufficient material has been received to complete the requisite quantity and tip the supplemental scale-beam the projection $f^{12}$ will be carried into engagement with the periphery of the wheel $f^{13}$, causing the rod $d^8$ to move to the left, Fig. 1, rocking the pivot $d^6$ and lifting the arm $d^5$ until the shoulder $d^{50}$ rises above the end of the spring-arm $d^9$, the weight of the material then in the left-hand side of the weighing-receptacle causing the same to swing upon its pivot, so that said material is dumped. As soon, however, as the material begins to be discharged it is obvious that the scale-beams will immediately return to their initial positions, opening the gate of the main chute and also allowing the projection $f^{12}$ to drop away from the periphery of the wheel $f^{13}$, so that the latch $d^5$ will return by its own weight to its normal position. As the weighing-receptacle swings, therefore, the spring-arm $d^{10}$ will come under the arm $d^5$, lifting the same until it has passed beyond the shoulder $d^{51}$, and in moving back under the influence of the weight of material, which it at once begins to receive, will react until the end of the said arm $d^{10}$ is caught by the said shoulder $d^{51}$, so that it remains in the said position until again filled and discharged as before. The weighing and apportioning of the material having thus been provided for it is necessary to provide means for properly packing the same, and to this end the machine embodying the present invention is provided with means for supporting the package and vibrating the same to shake down and condense the material and with means for compressing the material in the package and for laterally supporting the same during such compression to prevent the package (which may be a pasteboard box or paper bag) from bursting. It is obviously essential that the devices whereby these purposes are accomplished should operate immediately after the material is dumped from the weighing-receptacle and at no other times. To this end the said devices, which will be more fully described hereinafter, are normally maintained inoperative, but are caused to be operated (or, in other words, connected to a continuously-operating actuating mechanism) by a controlling device arranged to operate in response to the dumping movement of the scale-pan. Such controlling device is herein shown as a vertically-movable rod $d^{12}$, pivotally connected to the end of a lever $d^{13}$, which itself is pivoted at $d^{14}$ to a portion of the frame, the opposite end of said lever being in engagement with a rocker $d^{15}$, secured to the end of a rock-shaft $d^{16}$, adapted to be rocked in response to the movement of the scale-pan $d$. The said rocker has an extension at each side of its axis, the said extensions together normally lying flat upon the surface of the lever $d^{13}$, as shown in Fig. 1, it being obvious, therefore, that if the rock-shaft to which said rocker is connected is turned or rocked in either direction in its bearings $d^{17}$ it will cause one arm or the other to bear down upon the said lever $d^{13}$ and produce an upward movement of the rod $d^{12}$. In order, therefore, that the said rod $d^{12}$ may be lifted in response to the dumping movement of the weighing-receptacle or "scale-pan," as it may conveniently be called, the said rock-shaft is shown as extended across below the pivotal support $d^3$ for the said scale-pan, so that when the said scale-pan turns in either direction it will strike a curved or offset portion $d^{18}$ of said rock-shaft, causing the same to turn in one direction or the other, as the case may be. The portion $d^{18}$ is shown as provided with a covering of rubber or other yielding material $d^{19}$ to cushion the blow struck by the scale-pan. It is obvious, therefore, that when the scale-pan dumps in either direction the momentum thereof will cause the rocker to be rocked in one direction or the other, as the case may be, the said scale-pan swinging a little beyond its normal position, owing to its momentum, as stated, and at once returning to the position in which it is caught by the retaining device $d^5$, the rod $d^{12}$ at once dropping by gravity to its normal position, wherein it is adapted to render inoperative the parts controlled by it after a single cycle of operations.

The devices whereby the final packing is accomplished, which consist of the vibrating support $h$ for the package, the compressor $i$, adapted to enter the mouth of the package and compress the material therein, and the holding devices $k$, which consist of clamps shaped to conform to the package and adapted to close thereon simultaneously with the action of the compressor device, are all adapted to be operated by the shaft B, which, as has been stated, is continuously operated during the operation of the machine. To provide for the intermitting operation of said devices in response to the action of the scale-pan through the agency of the rod $d^{12}$, as above described, the shaft B is provided with a clutch mechanism adapted to be brought into operation by the lifting of said rod and to be automatically thrown out of operation at the end of a single revolution, which is arranged to produce a complete cycle of operations of the parts aforesaid. For this purpose the shaft B is provided with a gear-wheel $B^6$, meshing with a gear-wheel $D^2$, loosely mounted on a supplemental shaft D, which shaft is adapted by its rotation to actuate the packing devices hereinbefore enumerated, the said shaft being shown as provided for this purpose with a cam $h^2$, adapted to rotate therewith and to vibrate the shelf $h$, as will be described, and a crank-arm $i^{20}$, adapted to operate the compressor and also the holding devices, which are shown as connected to the said compressor. In the normal operation of the machine, therefore, the shaft D is stationary, with the gear-wheel $D^2$ rotating thereon, and in order to produce the rotation of the said shaft D and the consequent operation of the devices connected therewith it is necessary to connect said gear-wheel with said shaft, so that the said shaft will be rotated thereby. For this purpose the gear-wheel $D^2$ is shown as provided with a toothed wheel or ratchet $D^3$, connected thereto, as by screws $D^4$, so as to rotate therewith, and the shaft D is provided with a pawl $h^3$, shown as connected to the cam $h^2$ on a pivot $h^4$. The said pawl is provided with a spring $h^5$, the tendency of which is to rock the said pawl upon its pivot $h^4$, so that the engaging portion $h^6$ thereof will move into the path of the teeth of the ratchet-wheel $D^3$, thus connecting the cam $h^2$, which, as stated, is fast upon the shaft D, to the pinion $D^2$, so that the shaft will be rotated by the said pinion. To connect and disconnect the shaft D and gear-wheel $D^2$ through the agency of the pawl $h^3$, the said pawl is arranged to be engaged by the rod $d^{12}$ above described, as shown in Fig. 9, in such a manner as to rock the said pawl on its pivot to carry the end $h^6$ out of engagement with the teeth of the ratchet-wheel $D^3$. To this end the said pawl is provided with a projection $h^7$, adapted during the rotation of the shaft D to come in contact with the rod $d^{12}$, thus causing the pawl to be rocked on its pivot $h^4$, so as to be disengaged from the ratchet-wheel $D^3$.

Referring to Fig. 9, in which the parts are in their normal or inoperative position, it will be seen that when the rod $d^{12}$ is lifted, as hereinbefore described, by the movement of the scale-pan when the material is dumped therefrom the end of said rod will pass upward out of contact with the projection $h^7$, so that the pawl in response to its spring $h^5$ will move into the path of the ratchet-wheel $D^3$ and be caught thereby, so that the shaft D will become connected with the gear-wheel $D^2$ and rotated thereby. Since the lifting of the rod $d^{12}$, as has been above shown, is momentary, so that the said rod almost immediately becomes restored to its normal position, the projection $h^7$ at the end of a complete revolution of the shaft will come in contact with the end of the said rod, and the pawl will be tripped again, allowing the independent movement of the gear-wheel $D^2$ while the shaft D remains stationary. It is obvious that the frictional tendency of the gear-wheel is to rotate the said shaft, so that there is no chance of a reaction or backward movement of the said shaft, which might result in the engagement of the pawl with the ratchet-wheel, the pawl being pressed against the rod $d^{12}$, which constitutes a stop for the shaft, until it is momentarily lifted upon the dumping of the material from the scale-pan.

To vibrate the shelf $h$ after the material has been delivered to the package supported upon said shelf, the said shelf is provided with an arm $h^8$, connected therewith in any suitable or usual way and pivotally supported or mounted on a rock-shaft $h^9$, which has an arm or projection $h^{10}$, provided with a cam roll or pin $h^{12}$ in engagement with the surface of the cam-wheel $h^2$. In its normal position the shelf $h$ is, as shown in Fig. 2, about on a level with a feed-table H, so that the attendant can have a supply of empty packages on said feed-table and after removing the filled package can slide an empty one along said table until it rests upon the said shelf. The said package then receives the material from the chute $g$, which is directly over the said shelf $h$, and at the same time the shaft D is started, and the shape of the cam-wheel $h^2$, as shown in dotted line, Fig. 9, is such that the said shelf is first raised and then lowered and then raised, the cam-wheel being so shaped as to produce a vibratory movement of the said shelf during the first part of the rotation thereof. After the cam-wheel has made about half a revolution, however, it will be seen that the portion $h^{13}$ will come in contact with the cam-roll $h^{12}$ and lift the shelf $h$ to its highest position, where it will remain during the compressing operation, which is accomplished as follows: The compressor $i$ consists of a plunger of the proper size and shape to fit the package and normally stands in the position shown in Fig. 2 at the entrance of a lateral opening $g^2$ in the chute $g$, through which it is adapted to move down into the mouth of the package below the said chute. To operate the said plunger, it is shown as connected to the end of an arm or gooseneck $i^2$, fastened to a lever-arm $i^3$, mounted on a rock-shaft $i^4$, having bearings I in the side members of the frame-upright $A^2$, so that when the said shaft is rocked in the bearing it will produce a downward or upward movement of the said plunger toward or from the shelf $h$. It is desirable, of course, that the said plunger should remain in its normal position long enough to permit the free flow of material through the chute $g$ into the package and also during the shaking process produced as described by the vibration of the shelf $h$. For this purpose the rock-shaft $i^4$ is provided with a compensating connecting device to produce the desired operation thereof in response to the uniform rotation of the shaft D. As herein shown, the said connecting device consists of a link $i^6$, connected to the end of an arm $i^5$, secured to the rock-shaft $i^4$, so as to constitute in conjunction with the arm $i^3$ a lever having its fulcrum in the bearing I, and the said link is connected to a crank-arm $i^{20}$, secured to the shaft D, so that in the rotation of said shaft D an irregular oscillation of the rock-shaft $i^4$ is produced.

Taking the parts in their normal position (shown in full lines, Fig. 11) and referring to the diagram view, Fig. 12, it will be seen that during nearly a quarter of a revolution there will be no material movement of the lever, and consequently no downward movement of the plunger $i$. During this time the package is being agitated by the action of the cam above described and all the material discharged from the scale-pan has had ample time to pass down through the chute into the said package, so that it is then essential for the plunger to move down, which it does with a comparatively gradual movement, as is best illustrated in the diagram above referred to. Starting from the full line 7, which represents the link $i^6$ in its normal position, it will be seen that the point where said link is connected with the arm $i^5$ will remain substantially stationary until the said link $i^6$ reaches the position shown by dotted line 1. The said point will then begin to move in the direction of the dotted arrow, at first with a substantially uniform movement, as indicated by the dotted lines 2 3 4, the said movement becoming more gradual, as indicated by the lines 5, 6, 7, and 8, the final down movement being effected with great power, as is desirable to obtain the best results in compressing the material, the link and crank at this point acting substantially like a toggle-joint. To get the said plunger rapidly out of the way, however, in order that the package may be removed and an empty one placed in its stead by the attendant, it is desirable to have a rapid upward movement of the plunger, such being accomplished as shown by the full lines 1, 2, and 3 in the diagram, in which it will be seen that fully half of the return movement of the lever is accomplished in something less than one-sixth of the revolution of the shaft D, the plunger being substantially fully restored to its normal position during that portion of the rotation of the shaft shown between the lines 1 and 6. During the upward movement of the plunger, moreover, the shelf moves down through the action of the cam $h^2$, and the parts then come substantially to rest in the position shown in Fig. 2.

To properly position the package with relation to the plunger and securely hold the same and to prevent the same from bursting under the internal pressure brought to bear by the material when acted upon by the plunger, the machine is provided with holding devices $k$, as has been stated, which consist of clamping members properly shaped to conform to the outside of the package, the said members being herein shown as adapted for use with a rectangular package and having the clamping-faces $k^2$ for the sides of the package and clamping-faces $k^3$ for the front of the package, while the stationary supporting-wall $k^4$ supports the back of the package. To facilitate the removal of the filled package and the substitution of the empty one, the said holding devices are adapted to open and close in response to the rotation of the shaft D, and in order that they may close gradually and open quickly and remain open long enough to give ample time for the feeding operation they are shown as directly connected with the arm $i^3$, which carries the compressor, so that the same compensation in movement is provided for in both cases.

As herein shown, the holding devices are hinged in the projection K from the front of the frame and are provided with arms $k^5$, connected by links $k^6$ with a spindle or pin $k^7$, which has a bearing in the lever-arm $i^3$. Since the arms $k^5$ and the lever $i^3$, to which they are connected, are both pivotally supported and on different and non-parallel arcs, it is obvious that the link $k^6$ must be in the nature of a universal joint to compensate for the different paths of movement of said parts. To this end the said link $k^6$ is pivoted between the ears $k^{70}$ at the ends of the pin $k^7$, which, as has been stated, is free to rotate with relation to the lever-arm $i^3$, so that at this end the said links are free to move laterally as well as to swing with relation to the lever. A similar connection is made with the arm $k^5$ by means of the pin $k^{50}$, rotatably mounted in a suitable bearing at the end of said arm and having the lugs $k^{51}$, between which the link is pivotally connected in the same way as it is at its opposite end. As herein shown, the said link is made in two parts, provided with a right and left thread, and coupled together by means of a sleeve $k^{60}$, internally threaded to correspond, thus affording an opportunity to take up wear and also permitting a slight twist of one end of the link with relation to the other to further compensate for the different paths of movement of the parts connected by said link.

The operation of the machine as a whole is as follows: The material supplied to the hopper E falls through the main and supplemental chutes into the scale-pan $d$, which is promptly filled to nearly the desired extent by the material falling through the main chute, at which time the main scale-beam is tipped so as to shut off the main chute by the operation of the controlling device therefor, and the remainder of the material is supplied through the continuously-operating supplemental chute, which soon results in the tipping of the supplemental scale-beam, which causes the scale-pan to be tripped, so that the weight of the material in the scale-pan tips the same, whereby the said material is discharged into the package supported upon the shelf below. The tipping of the scale-beam results in the lifting of the tripping-rod $d^{12}$, which causes the operation of the shaft D, which results, as has been described, first in the vertical vibration of the supporting-shelf for the material and then in the closing of the holding device to externally support the walls of the package, such operation being substantially simultaneous with that of the compressing device, which operates to compress the material in the package. The complete rotation of the shaft D results in the restoration of the holding devices to their normal or open position and the compressing device to its normal or upper position, in which it is out of the way of the material to be dumped into the chute or funnel $g$ at the end of the next weighing operation. After this cycle of operations the shaft D is stopped by the engagement of the rod $d^{12}$ with the controlling-pawl, so that the said shaft remains stationary until the material dumps again, when the same cycle of operations takes place, as above described.

It is not intended to limit the invention to the specific construction and arrangement herein described, since modifications may obviously be made without departing from the invention, which consists mainly in the combination of instrumentalities, the specific operating devices for which may be readily modified, for obtaining the results hereinbefore set forth.

I claim—

1. In a weighing-machine, the combination with main and supplemental chutes, the capacity of the former being substantially greater than that of the latter; of a scale-pan adapted to receive material from both of said chutes; main and supplemental scale-beams connected with said pan and adapted respectively to be tipped when nearly the requisite amount of material has been received by the scale-pan and the whole of such amount has been so received; a gate or valve at the mouth of said main chute for opening and closing the same, said valve being adapted to be operated in response to the movement of the main scale-beam; and means for causing the said scale-pan to move in such a way as to dump the material contained therein in response to the movement of the supplemental scale-beam, substantially as described.

2. In an automatic weighing-machine, the combination with a scale-pan adapted to receive the material to be weighed; of means operating in response to the weight of a given amount of material to cause said scale-pan to tip and thus deliver the material when the requisite amount has been received thereby; a support for a package so positioned that the package supported thereon will receive material from said scale-pan; a compressing device adapted to compress the material within the said package after it has been delivered thereto from the said scale-pan; an external holding device adapted to engage and support the walls of said package during the operation of compressing the material therein; and means for operating the said compressing device and said holding device in response to the tipping of the scale-pan to deliver the material therefrom, substantially as described.

3. In an automatic weighing-machine, the combination with the main and supplemental chutes; of a scale-pan having two compartments and pivoted below its center of gravity upon a suitable frame, the main scale-beam controlling the vertical movement of said frame and adapted to be tipped when nearly the requisite amount of material has been received by said scale-pan; a controlling device for the main chute operating in response to the movement of said main scale-beam; a supplemental scale-beam also connected to said frame and adapted to be tipped when the whole of a predetermined amount of material has been received by said scale-pan; a locking device adapted to hold the said scale-pan in a position to receive and retain material in one side thereof, said locking device comprising a pair of spring-arms connected to said scale-pan, and a latch adapted to engage one or the other of said arms according to the position assumed by said scale-pan; and means for tripping the said latch in response to the upward movement of the supplemental scale-beam to permit the scale-pan to swing on its center in response to the weight of the material therein, whereby the other spring-arm comes into engagement with and is caught by the said latch, substantially as described.

4. In an automatic weighing-machine, the combination with the main and supplemental chutes; of a scale-pan having two compartments and pivoted below its center of gravity upon a suitable frame, the main scale-beam controlling the vertical movement of said frame and adapted to be tipped when nearly the requisite amount of material has been received by said scale-pan; a controlling device for the main chute operating in response to the movement of said main scale-beam; a supplemental scale-beam also connected to said frame and adapted to be tipped when the whole of a predetermined amount of material has been received by said scale-pan; a locking device adapted to hold the said scale-pan in a position to receive and retain material in one side thereof, said locking device consisting of a pair of spring-arms connected to said scale-pan, and a latch adapted to engage one or the other of said arms according to the position assumed by said scale-pan; means for tripping the said latch in response to the upward movement of the supplemental scale-beam to permit the scale-pan to swing on its center in response to the weight of the material therein whereby the other spring-arm comes into engagement with and is caught by the said latch; a support for the package below said scale-pan; a compressor adapted to enter the mouth of said package and compress the material therein; mechanism for intermittingly operating said compressor; and a device controlling said mechanism adapted to operate in response to the movement of said scale-pan, substantially as described.

5. In an automatic weighing-machine, the combination of the scale-pan adapted to receive material which is to be weighed and means for causing the said scale-pan to move in such a way as to dump said material after a requisite amount thereof has been received thereby; a support for the package; a compressing device adapted to operate upon the material received by said package; intermittingly-operating mechanism for said compressing device; means for controlling the operation thereof, and an actuating device for said controlling means comprising a lever, a rocker having lateral extensions normally in engagement with said lever, a rock-shaft for said rocker, and means for rocking said rock-shaft in response to the movement of the scale-pan, substantially as described.

6. In an automatic weighing-machine, the combination with a scale-pan adapted to receive the material to be weighed; of a main chute adapted to rapidly deliver to said scale-pan nearly the requisite amount of material; a continuously-operating supplemental chute of less capacity than that of the main chute; a controlling device for the main chute comprising a gate or valve for the same; a main scale-beam adapted to be tipped when nearly the requisite amount of material has been received by the scale-pan; and an actuating device for closing said gate in response to the movement of said scale-beam, comprising a continuously-rotating shaft having ratchet-teeth thereon; a lever having an arm provided with a forked extremity having oppositely-disposed teeth at the inner sides thereof; means for rocking said arm so that the teeth at one side or the other of said fork are brought into engagement with the teeth on the shaft to produce an upward or downward movement thereof; a projection or pin on said lever; an arm connected with the said gate adapted to open and close the same, and having a forked end into which said pin projects, shoulders at the opposite sides of said forked projection adapted to be engaged by said pin; and a spring connecting said arm and said lever and adapted to crowd the said pin into engagement with one or the other of said shoulders, substantially as described.

7. In an automatic weighing-machine, the combination with the weighing devices, of a chute adapted to deliver the material to said weighing devices, a valve controlling the said chute and provided with an actuating device whereby it is adapted to be closed, a continuously-movable operating device from which said actuating device is normally disconnected, and means for connecting said operating and actuating devices in response to a movement of the weighing devices caused by the weight of the material received thereby, so that the valve is closed and the supply cut off after a certain predetermined amount of material has been delivered from the chute, substantially as described.

8. In an automatic weighing-machine, the combination with the weighing devices, of a chute adapted to deliver the material to said weighing devices; a controlling device for said chute comprising a gate or valve, and actuating mechanism for closing the said valve in response to the movement of the weighing devices, said actuating mechanism comprising a lever adapted to be moved on its fulcrum by the movement of the weighing devices; a pin or projection from said lever, an arm connected with the said valve and adapted by its movement to open and close the same, the said arm having a forked end into which the said pin projects; shoulders at the opposite sides of said forked end adapted to be engaged by said pin; and a spring connecting said arm and said lever and adapted to crowd the said pin into engagement with one or the other of said shoulders, substantially as described.

9. In an automatic weighing-machine, the combination with the weighing devices; of a chute for delivering the material to be weighed to said weighing devices; a controlling device for said chute comprising a valve adapted to open and close the outlet therefrom; an actuating device for positively moving said valve in either direction, said actuating device coöperating with the weighing devices; and means for locking said valve in its open or closed position after it has been moved thereto by said actuating device, substantially as described.

10. In an automatic weighing-machine, the combination with a weighing device or scale provided with a receptacle to receive the material to be weighed, of a chute adapted to deliver the material to said receptacle, a valve controlling the said chute, an actuating device adapted to open and close said valve, a continuously-movable operating device adapted to operate said actuating device, said actuating device being normally disconnected therefrom, and means for connecting said devices to cause the closing of the valve by the movement of the weighing devices in response to the weight of the material and for connecting said devices to cause the opening of the valve by the movement of the weighing devices to their normal position after the material has been delivered therefrom, substantially as described.

11. In a weighing and packing machine, the combination with a pivoted scale-pan normally locked in position to receive and retain material delivered thereto, of weighing devices supporting said scale-pan and movable in response to the weight of a predetermined amount of material, means for unlocking said scale-pan in response to the movement of the weighing devices to permit said scale-pan to tip and deliver the said material into a suitable package, an agitating device for the package to shake down the material therein, a packing device for compacting the material in said package after it has been shaken down, operating mechanism from which said agitating and packing devices are normally disconnected, and means for connecting said devices with said operating mechanism in response to the movement of the weighing devices aforesaid, substantially as described.

12. In an automatic weighing and packing machine, the combination with the weighing devices adapted to weigh the material and deliver the same into a suitable package, of a compressor to operate upon the material in the package after it is thus delivered thereto, actuating mechanism for said compressor adapted to operate in response to the delivery of the material from the weighing devices to the package, and compensating devices connecting said actuating mechanism and said compressor, substantially as and for the purpose described.

13. In an automatic weighing and packing machine, the combination with the weighing devices adapted to weigh the material and deliver it into a suitable package, of a compressor to operate upon the material in the package, a rotatable actuator for said compressor adapted to operate in response to the delivery of the material from said weighing devices, and compensating connecting mechanism connecting said rotatable actuator and said compressor, said compensating mechanism comprising a crank connected with said rotatable actuator, a lever pivotally supported and connected at one end with the said compressor, and a link connected with the other end of said lever and with said crank, substantially as described.

14. In an automatic weighing and packing machine, the combination with the weighing devices adapted to weigh the material and deliver the same when weighed, of packing devices comprising a compressor adapted to operate upon the material which has thus been delivered by said weighing devices and to compress the same into a package, a movable holder adapted to close upon said package to laterally support the same during the operation of the compressor, and connecting mechanism whereby the said compressor and holder are adapted to be operated in response to the delivery of the material from the weighing devices to the package, substantially as described.

15. In an automatic weighing and packing machine, the combination with the weighing devices adapted to weigh the material and deliver it into a package, of a normally-stationary support for the package, means for intermittingly agitating said support to shake down or settle the material after it has been received thereby, and a device for controlling such agitating means adapted to operate in response to the delivery of the material from the weighing devices, substantially as described.

16. In an automatic weighing and packing machine, the combination with weighing devices adapted to weigh and deliver the material, of a support for the package which is to receive the material, means for agitating said support to shake down the material in the package, a compressor adapted to enter the mouth of the package to compress the material contained therein, movable holding devices adapted to close on said package to laterally support the same during the compressing operation, a common actuating device for first agitating said shelf and then closing the said holders and moving the compressing device; and means for controlling the operation of said common actuating device in response to the movement of the weighing devices to deliver the material after it has been weighed, substantially as described.

17. The combination with the compressor comprising a pivotally-supported arm or lever provided with a plunger adapted to enter the mouth of the package, of the holding devices for the package pivotally secured to the frame of the machine, a link connecting said compressor and holding devices, and connected therewith respectively by universal joints, a shaft adapted by its rotation to rock the compressor-lever on its fulcrum and thereby operate both the compressor and the holding devices, and means for connecting said shaft with and disconnecting said shaft from the continuously-operating main shaft of the machine, substantially as described.

18. The combination with the weighing devices, of an intermittingly-operated shaft, the operation of which is controlled by the movement of the weighing devices, a support for the package which is to receive material from the weighing devices, a lever connected with said support, a cam carried by said intermittingly-operated shaft adapted to coöperate with said lever to produce a movement of said support, a compressing device comprising a plunger carried by a pivoted arm or lever, holding devices connected with said compressing device and adapted to close on the package in the operation of said compressing device and to open during the return movement thereof, a crank on the intermittingly-operated shaft, and a link connecting said crank and said compressing device, substantially as described.

19. In a weighing and packing machine, the combination with weighing devices adapted to weigh the material and deliver the same into a package, of packing devices for compacting or compressing the material in said package, a rotatable actuator for said packing devices, a continuously-rotating shaft concentric with said rotatable actuator, and provided with a toothed wheel, a pawl carried by said rotatable actuator but normally withheld from engagement with said toothed wheel, and means for causing the said pawl to engage with said toothed wheel in response to the delivery of the material from the weighing devices, substantially as described.

20. In a weighing and packing machine, the combination with weighing devices adapted to weigh the material and deliver the same into a package; of packing devices for compacting or compressing the material in said package; a continuously-rotating shaft adapted to operate said packing devices, said shaft being provided with a toothed wheel or ratchet; an actuating wheel or disk directly connected with said feeding device and having a bearing on said shaft but not normally connected to rotate therewith; a pawl on said disk adapted to engage said ratchet and rotatably connect said shaft and disk; a movable projection adapted in the rotation of said disk to engage said pawl and lift the same out of engagement with the said ratchet and thereby disconnect said shaft and disk; and means for momentarily moving said projection out of engagement with said pawl in response to the delivery of the material from the weighing devices; whereby said disk is connected with the shaft during one revolution thereof at the end of which revolution it is disengaged therefrom by the lifting of the pawl and held stationary, substantially as described.

21. In a weighing-machine, the combination with a pivotally-supported scale-pan normally held in such a position as to receive and retain material fed thereto but arranged so as to tip on its pivot and dump the said material when released, and means for releasing said scale-pan after it has received a predetermined amount of material; of packing devices adapted to operate upon the material thus delivered and compact or compress the same into a suitable package, operating mechanism for said packing devices itself continuously movable but normally disconnected from said packing devices, and a controller adapted by its movement to cause said packing devices to be connected with said operating mechanism, the said controller being operated by the said scale-pan when it tips to dump the material, substantially as described.

22. In an automatic weighing-machine, the combination with the scale-pan having two compartments and pivoted below its center of gravity, the normal position of said scale-pan being such that one of said compartments will receive material to be weighed; of means for locking said scale-pan in such position until the requisite amount of material has been received thereby, and for then releasing the same whereby the same is allowed to tip and dump the material from one compartment and bring the other compartment into position to receive material; a rock-shaft adapted to be engaged and rocked by the engagement therewith of the scale-pan in its movement in either direction; a controlling device arranged to be operated by the rocking movement of said rock-shaft; and packing mechanism for compacting the material after it has been weighed, said packing mechanism being controlled in its operation by the said controlling device, substantially as described.

23. In a weighing-machine, the combination with the weighing devices adapted to receive and weigh the material and deliver it into a suitable package; of packing devices to operate upon the material after it has been so delivered; an actuating-shaft for the said packing devices; a continuously-operating shaft from which said actuating-shaft is normally disconnected; a spring-actuated pawl carried by said actuating-shaft for connecting the same with said continuously-operating shaft; a controller or tripping device adapted to normally hold said pawl tripped; and means for momentarily moving said controller away from the pawl in response to the delivery of the material from the weighing devices, whereby the packing devices are caused to make one complete cycle and to return to their normal positions, at which time the pawl again comes in contact with and is tripped by said controller, substantially as described.

In testimony whereof I have signed my name to this specification in the presence of two subscribing witnesses.

JOHN A. OSTENBERG.

Witnesses:
H. J. LIVERMORE,
JAS. J. MALONEY.